B. J. Camp.
Scroll-Saw.
No. 3,126.
Reissued Sept. 22, 1868
Fig. 1
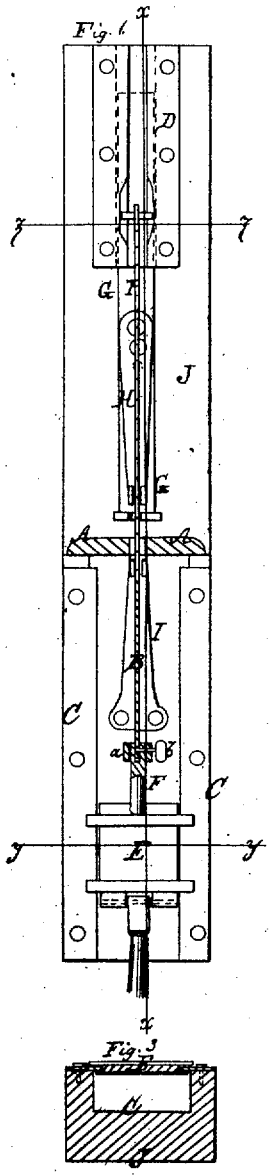
Fig. 2
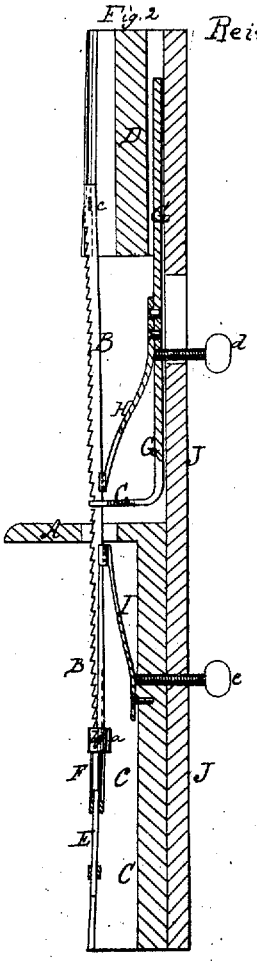
Fig. 3
Fig. 4
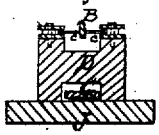
Fig. 5
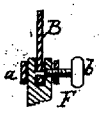
Witnesses
Thos Trusche
Wm Trewin
Inventor.
B. J. Camp
Per Munn & Co
Attorneys

United States Patent Office.

B. J. CAMP, OF MARION, OHIO.

*Letters Patent No.* 74,497, *dated February* 18, 1868; *reissue No.* 3,126, *dated September* 22, 1868.

IMPROVEMENT IN SCROLL-SAWS.

The Schedule referred to in these Letters Patent and making part of the same.

TO ALL WHOM IT MAY CONCERN:

Be it known that I, B. J. CAMP, of Marion, in the county of Marion, and State of Ohio, have invented a new and useful Improvement in Scroll-Saws; and do hereby declare the following to be a full, clear, and exact description thereof, reference being had to the accompanying drawings, and to the letters of reference marked thereon, and in which—

Figure 1 is a front view, partly in section, of my improved saw.

Figure 2 is a vertical sectional elevation of the same, taken on the line *x x*, fig. 1.

Figure 3 is a detail horizontal section of the same, taken on the line *y y*, fig. 1.

Figure 4 is a detail horizontal section of the same, taken on the line *z z*, fig. 1; and Figure 5 is a detail vertical section, showing the manner of fastening the lower end of the saw.

My invention relates to a new manner of fastening and guiding reciprocating scroll-saws, so that the same will work with great ease, and can be operated with the greatest speed, without jarring or getting out of order; and it consists, first, in the manner of securing the lower end of the saw, by means of a tenoned screw, to a vertical-slotted shank, projecting from a reciprocating cross-head, of usual construction; second, in the form and arrangement of the upper and lower guides, both of which are inclined, or their lower ends thrown forward, whereby a raking motion is given to the saw, without necessitating an increase of power.

Also, in the application of adjustable springs, with grooved ends, to guide the saw and prevent it from bending, one or both of said springs being secured to an up-and-down sliding shoe and guide-block.

In order to enable others skilled in the art to make and use my invention, I will now proceed to describe its construction and operation, referring to the annexed drawings, which form a part of this specification.

A represents the table or platform; B is the saw-blade; C is the lower stationary guide; D is the upper stationary guide.

The two guides are secured to some substantial frame. Their faces are inclined, as shown in fig. 2, *i. e.*, their lower ends are thrown further forward than their upper ends, their angles of inclination being exactly equal to each other.

In the lower guide slides a cross-head, E, which is moved by a pitman, from a crank-shaft or otherwise.

From the upper edge of the cross-head projects a slotted vertical pin, F. The lower end of the saw is held in this slotted pin, and a sleeve, *a*, is arranged around the same, in which a set-screw, *b*, is held, as shown in fig. 5. The end of this set-screw is provided with a tenon, which is inserted into a hole in the saw, but, being a trifle shorter than the thickness of the saw, it does not pass entirely through the same, so that the saw is in fact clamped between the shoulder on the set-screw on one side, and one arm of the pin F on the other side.

To the upper end of the saw is secured a flat pin, *c*, which is made of steel, and passed through a hole in this end of the saw, then flattened to prevent it from coming out, and then hardened to prevent heating, and which pin operates, instead of a cross-head working in grooves, in the upper guide D.

G is an L-shaped bar, the vertical arm of which is fitted through a hole in the upper guide, in such a manner that it can be raised and lowered at will. The end of its horizontal arm is forked, and fits around the saw-blade, above the table A, to guide the same.

H is a spring, which is secured to the up-and-down adjustable bar G, and is provided with forked steel ends, which fit around the saw-blade, and serve to guide the saw, at the same time preventing the saw from bending sideways.

I is a spring, which is secured to the upright frame, J, to which the guides are secured, said spring being arranged below the table A, as shown. This spring is also provided with forked steel ends, which act on the saw-blade in a similar manner as the spring H.

The set-screws *d* and *e*, which strike the springs H and I on their lower side, are used for the purpose of regulating the springs for different width of saws.

Having thus fully described my invention, what I claim as new, and desire to secure by Letters Patent, is—

1. Securing or clamping the lower end of the saw-blade B to the slotted pin F, by means of the sleeve *a* and tenoned set-screw *b*, the tenon thereof being inserted into a hole in the saw, so that the saw is clamped between the shoulder of said set-screw and side of the pin F, substantially as herein set forth.

2. The forked adjustable springs H and I, arranged, as described, one above and one below the saw-table, for the purpose of obviating the danger of breaking the saw, at the same time as they act as guides for it, substantially as herein set forth.

3. The up-and-down adjustable guide-bar G, carrying the bent spring H, constructed and arranged to operate substantially as herein set forth.

In testimony that I claim the foregoing, I have hereunto set my hand, this 25th day of June, 1868.

B. J. CAMP.

Witnesses:

A. N. MARR,

LEOPOLD EVERT.